(12) United States Patent
Miura

(10) Patent No.: US 6,580,749 B1
(45) Date of Patent: Jun. 17, 2003

(54) CDMA RECEIVER HAVING A CONTROLLABLE SEARCH RANGE AND METHOD FOR CONTROLLING THE SAME

(75) Inventor: Tetsuya Miura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/567,102

(22) Filed: May 8, 2000

(30) Foreign Application Priority Data

May 10, 1999 (JP) .......................................... 11-128507

(51) Int. Cl.$^7$ ................................................ H04B 1/69
(52) U.S. Cl. ...................................... 375/147; 370/320
(58) Field of Search ................................ 375/130, 147, 375/136, 144; 370/320, 335, 342, 441; 342/33

(56) References Cited

U.S. PATENT DOCUMENTS

| 5,644,591 | A |   | 7/1997  | Sutton ......................... 375/142 |
| 5,726,982 | A |   | 3/1998  | Witter |
| 5,790,589 | A |   | 8/1998  | Hutchison, IV et al. |
| 5,920,278 | A | * | 7/1999  | Tyler et al. ..................... 342/33 |
| 6,151,311 | A | * | 11/2000 | Wheatley et al. ........... 370/252 |
| 6,161,022 | A | * | 12/2000 | Hwang et al. ............... 455/561 |
| 6,226,282 | B1 | * | 5/2001  | Chung ......................... 370/335 |
| 6,275,483 | B1 | * | 8/2001  | Papasakellariou et al. .. 370/252 |
| 6,301,311 | B1 | * | 10/2001 | Sheba ......................... 375/326 |
| 6,307,840 | B1 | * | 10/2001 | Wheatley, III et al. ..... 370/252 |
| 6,320,849 | B1 | * | 11/2001 | Hughes et al. .............. 370/310 |
| 6,370,397 | B1 | * | 4/2002  | Popovic et al. ............. 370/342 |
| 6,434,185 | B1 | * | 8/2002  | Struhsaker et al. ......... 370/342 |

FOREIGN PATENT DOCUMENTS

| FR | 2 737 362   | 1/1997  |
| JP | 4-77022     | 3/1992  |
| JP | 9-503374    | 3/1997  |
| JP | 9-247045    | 9/1997  |
| JP | 10-173629   | 6/1998  |
| JP | 10-173630   | 6/1998  |
| JP | 10-200508   | 7/1998  |
| JP | 10-308689   | 11/1998 |
| JP | 11-261524   | 9/1999  |
| JP | 11-298401   | 10/1999 |

* cited by examiner

Primary Examiner—Emmanuel Bayard
(74) Attorney, Agent, or Firm—Sughrue Mion, PLLC

(57) ABSTRACT

In a CDMA receiver used in a CDMA cellular mobile telephone system, a searcher which is used to determine reception timing of a plurality of finger processing portions has a controllable search window to enable wide searching range without any expansion of a size. Specifically, the controllable search window is shifted or delayed so that the reception timing lies therein to decrease the number of the correlators and/or the adders.

21 Claims, 9 Drawing Sheets

CDMA RECEIVER HAVING A CONTROLLABLE SEARCH RANGE AND METHOD FOR CONTROLLING THE SAME

BACKGROUND OF THE INVENTION

This invention relates to a code division multiple access (CDMA) receiver for use in a CDMA system and a method of controlling the CDMA receiver.

As a cellular mobile radio communication system, a wide variety of multiple access systems have been heretofore proposed and be adopted in the world. Among others, a recent tendency has been directed to a cellular mobile radio code division multiple access (CDMA) system which has a specific spreading code assigned to each channel and which will be simply called a CDMA system. In such a CDMA system, a modulated wave of an identical carrier frequency which is spread by each specific spreading code is transmitted as a radio signal from a transmitter side to a receiver side. Responsive to the radio signal, a CDMA receiver in the receiver side carries out synchronization operation by the use of each specific spreading code to identify a desired channel. In order to distinguish the channels from one another, different spreading codes are used to identify radio channels between the base station and the mobile stations.

In addition, it is to be noted that the radio signal is received through a plurality of paths, namely, a multipath in the CDMA system and, therefore, multipath fading should be removed from the radio signal in the CDMA receiver by accurately detecting a predetermined signal, such as a synchronization signal and/or a pilot signal.

Furthermore, it is to be considered in the cellular mobile radio communication system that each mobile station is moved through the radio service areas or cells from one to another with communication kept between each mobile station and a base station. In this event, the base stations must be switched from one to another without interrupting communication with each mobile station.

Taking the above into account, a CDMA receiver which is used in a mobile station has a rake receiver supplied with radio signals through the multipath and a searcher for searching such multipath signals to establish chip synchronization. In other words, the searcher is used to detect optimum reception timing from the radio signals and to inform the rake receiver of the optimum reception timing. This applies to the CDMA receiver which is used in each base station. Therefore, the following description will be mainly made about the CDMA receiver of the base station.

Practically, both the rake receiver and the searcher are given received data signals which are subjected to high frequency amplification and frequency conversion by a high frequency amplifier and an intermediate amplifier, respectively. In this event, the rake receiver is operable in response to the received data signals received through the multipath and comprises a plurality of finger receivers for demodulating the received data signal by the use of a spreading code into a demodulated signal. To this end, calculations are made about correlations between a spreading code of a desired channel and each received multipath signal to capture codes at each reception timing through each path. Thereafter, maximal-ratio combining is carried out to augment received signal strength. Such maximal-ratio combining is effective to alleviate an influence of the multipath fading and to improve a signal-to-noise (S/N) ratio.

On the other hand, the searcher has a plurality of correlators which are operable in response to the received data signals and delayed spreading codes to calculate correlation values between the received data signals and the delayed spreading codes and a plurality of adders for adding the respective correlation values to produce summed up correlation values. Moreover, the summed up correlation values are delivered to an effective path judgment circuit to determine an effective path and to supply the finger circuits of the rake receiver with reception timing signals representative of the effective path or optimum reception timing.

Herein, it is to be noted that the correlators of the searcher are in one-to-one correspondence to the adders.

Recently, recent attempts have been made to widen each of the cells in such a CDMA system to reduce a frequency of handoff operations for switching the base stations from one to another. This results in enlargement of a cell radius of each cell. Such enlargement of the cell radius brings about expanding or widening a searching range in the searcher of the CDMA receiver in each base station. In other words, the searcher must be widened in the searching range.

In order to widen or expand the searching range in the searcher, it is necessary to increase the correlators and the corresponding adders in number. Practically, the searching range is determined by a chip number of the spreading code and must have a predetermined resolution. In consequence, the correlators and the corresponding adders should be increased in number as the searching range is widened because the number of the correlators is equal to a product of the chip number and the resolution as well as the number of the adders.

Under the circumstances, the searcher is inevitably complicated in structure as the searching range is widened, because of a large number of the correlators and the adders. In addition, it is very difficult to make each base station small in size when the correlators and the adders are increased in number.

In other words, a conventional searcher has a fixed search window having a constant searching range where the searcher can search. The constant searching range is determined by the number of the correlators or the adders. The fixed search window is defined by a starting time instant which is equal to a reference reception timing of a base transceiver station (BTS) that has zero propagation delay. In other words, the fixed search window has no window offset. In order to expand or widen the constant searching range in the fixed search window, the searcher must increase the correlators and the adders in number.

It will be assumed that the CDMA receiver carries out reception operation under environment with a large propagation delay such as a case of having a large cell radius or the like. In this event, the conventional searcher must comprise a correlation calculator and an adder portion which have the large number of correlators and the large number of adders, respectively. This is because the searcher has the fixed search window and it is therefore necessary to make the correlators and the adders large in number in order to expand or widen the constant searching range. Accordingly, the conventional searcher is large in structure.

In addition, various prior arts related to the present invention are already known. By way of example, a method and an apparatus for performing search acquisition in a CDMA communications system is disclosed in U.S. Pat. No. 5,644,591 issued to Todd R. Sutton. According to Sutton, a large window of PN chip offset hypotheses are searched and if an energy signal is found that might indicate the presence of the pilot signal having one of the chip offsets of the large search window, then a search of a subset of offset hypotheses, or small window, is searched.

In a searcher according to Sutton, if the search window is swept and no hypothesis's energy exceeds the detection threshold, then searcher controller would begin sweeping the next search window. In other words, the searcher according to Sutton mainly aims to search reception timimg of an effective path or the pilot signal. It will be assumed that the reception timing lies in one of the both ends of the search window by changing the reception timing of the effective path caused by moving a mobile station. In this event, it is feared that it cannot decide whether this path lies in a current search window or the next search window (or a previous search window). Under the circumstances, it is difficult to stably carry out reception processing.

Japanese Unexamined Patent Publication of Tokkai No. Hei 10-173,629 or JP-A 10-173629 discloses "RECEIVING DEVICE" to precisely operate RAKE reception valid to code division multiplex system communication spread spectrum by setting a numerical value expecting an error range corresponding to a reception quality as a threshold value, and using it as the judgment reference of the output of a searcher circuit. According to JP-A 10-173629, a received signal is supplied to delays and despreading parts. The output of the delays are supplied to despreading parts. In the despreading parts, the despreading of the received signal is operated by the replica of a spreading code generated by a spreading code generating part, and secondary modulation is released. The despread signal is weighted according to a reception level by weighing circuits. Then, correlation values outputted by a sliding correlator and comparing parts are multiplied by the received signals, outputted by the corresponding despreading parts, and added by a synthesizing part. Then, the rate of a desired wave receiving power to an interrupting wave-receiving power to an interrupting wave-receiving power is calculated as quality information by an SIR measuring part.

However, JP-A 10-173629 may disclose a technical idea which uses the numerical value expecting the error range corresponding to the reception quality as the judgement reference of the output of the searcher circuit.

Japanese Unexamined Patent Publication of Tokkai No. Hei 10-173,630 or JP-A 10-173630 discloses "CDMA CHIP-SYNCHRONIZING CIRCUIT" to attain synchronizing follow-up (tracking) on the fluctuation of a reception level, and to attain stable reception by selecting and demodulating a correlator output (a despread signal) in a timing with the most satisfactory reception quality in a constant time interval. According to JP-A 10-173630, a delaying means delays a despread code, so that it can be matched with a reception timing detected by a search means. Next, a shift register, having a plurality of output terminals, delays the delayed despread code in a constant delay interval. Then, a plurality of correlators operate the despreading of a received signal by calculating a correlation value between a digital base-band signal and each output of the shift register. Then, the outputs of the plurality of correlators are temporarily stored in a memory means. An optimal value detecting means and a selecting means read the memory in a constant interval, and selects the correlator output with the most satisfactory reception quality. Then, a synchronization detection means operates synchronization detection by using the selected correlator output.

However, JP-A 10-173630 neither discloses nor teaches concrete structure of the search means.

Japanese Unexamined Patent Publication of Tokkai No. Hei 10-200,508 or JP-A 10-200508 discloses "TERMINAL EQUIPMENT FOR RADIO SYSTEM AND SEARCH METHOD" to shorten a search time when a demodulation output is not obtained in a CDMA system portable telephone system. According to JP-A 10-200508, a terminal equipment is provided with a next candidate memory that stores a code being a next candidate. When a demodulation output is not obtained and the code of the next candidate is stored in the next candidate memory, the code is partially searched based on the code to try demodulation. When the demodulation can be conducted, the demodulation is conducted by the code and only when the demodulation cannot be conducted, is the code searched with respect to all the phase by a searcher. Thus, the search time when no demodulation output is obtained is shortened.

JP-A 10-200508 may disclose a technical idea which carries out searching on the basis of the code of the next candidate stored in the next candidate memory when the demodulation output id not obtained.

Japanese Granted Patent Publication No. 2,853,705 or JP-B 2853705 discloses "SPREAD SPECTRUM COMMUNICATION RECEIVER" to eliminate erroneous detection of high level noises and to prevent deterioration of a characteristic when a plurality of paths in multipath phasing at low reception level and large fluctuation are detected in a spread spectrum communication receiver. According to JP-B 2853705, a search path detected in a search part and a tracking path tracked in a tracking part are held in a path acquisition/holding part, and a target signal is extracted by a front protection and a back protection. A correlation demodulation path selection part removes the path for signals other than the target one, selects the path to be demodulated and synthesizes rake in a rake part. A path front protection means sets a window of about one chip for the presence of a path and detects the existence of multi-paths when they continuously exist within the range of the window. A path back protection means detects the elimination of multi-paths when they do not continuously exist. The number of stages for executing front protection and back protection is suitably changed in accordance with an external situation.

JP-B 2853705 may disclose a technical idea for extracting a target signal by means of a front protection and a back protection in a path acquisition/holding part which compares a search path detected in a searcher part and a tracking path tracked in a tracking part.

SUMMARY OF THE INVENTION

It is an object of this invention to provide a receiver which is usable in a CDMA system, which is simple in structure and small in size.

It is another object of this invention to provide a receiver of the type described, which is capable of coping with widening a searching range of a searcher without increasing correlators and adders included in the searcher.

It is still another object of this invention to provide a receiver of the type described, which is usable in a base station and which is operable at a high speed.

It is another object of this invention to provide a searcher which is capable of searching optimum reception timing from a wide searching range without an increase of correlators and/or adders.

It is yet another object of this invention to provide a method of searching optimum reception timing from a wide searching range without an increase of correlators and adders.

According to an aspect of this invention, a method is for use in searching reception timing from received data signals which are received through a plurality of paths by a searcher in a CDMA system to detect the reception timing. The method comprises the steps of calculating, in a controllable search window having a constant searching range where the searcher can search, correlation values between the received data signals and spreading codes successively delayed, to produce summed up correlation values, of determining the reception timing from the summed up correlation values, and of shifting the controllable search window so that the reception timing lies in the controllable search window.

According to another aspect of this invention, a method is for use in receiving received data signals to produce a decoded data signal in a CDMA system and comprises the steps of calculating, in a controllable search window having a constant searching range, correlation values between the received data signals and spreading codes successively delayed, to produce summed up correlation values, of determining reception timing from the summed up correlation values, of shifting the controllable search window so that the reception timing lies in the controllable search window, of despreading the received data signals by using the reception timing to produce despread and detected data signals, of carrying out maximal-ratio combining of the despread and detected data signals to produce a combined data signal, and of decoding the combined data signal into the decoded data signal.

According to still another aspect of this invention, a searcher is for use in a CDMA receiver to search reception timing from received data signals which are received through a plurality of paths and comprises calculation means for calculating, in a controllable search window having a constant searching range where the searcher can search, correlation values between the received data signals and spreading codes successively delayed, to produce summed up correlation values, decision means for determining the reception timing from the summed up correlation values, and shifting means for shifting the controllable search window so that the reception timing lies in the controllable search window.

According to yet another aspect of this invention, a CDMA receiver is for use in a CDMA system to produce a decoded data signal in response to received data signals and comprises calculation means for calculating, in a controllable search window having a constant searching range, correlation values between the received data signals and spreading codes successively delayed, to produce summed up correlation values, determining means for determining reception timing from the summed up correlation values, shifting means for shifting the controllable search window so that the reception timing lies in the controllable search window, despreading means for despreading the received data signals by using the reception timing to produce despread and detected data signals, means for carrying out maximal-ratio combining of the despread and detected data signals to produce a combined data signal, and means for decoding the combined data signal into the decoded data signal.

DESCRIPTION OF THE PREFERRED EMBODIMENTS

Figure 1:
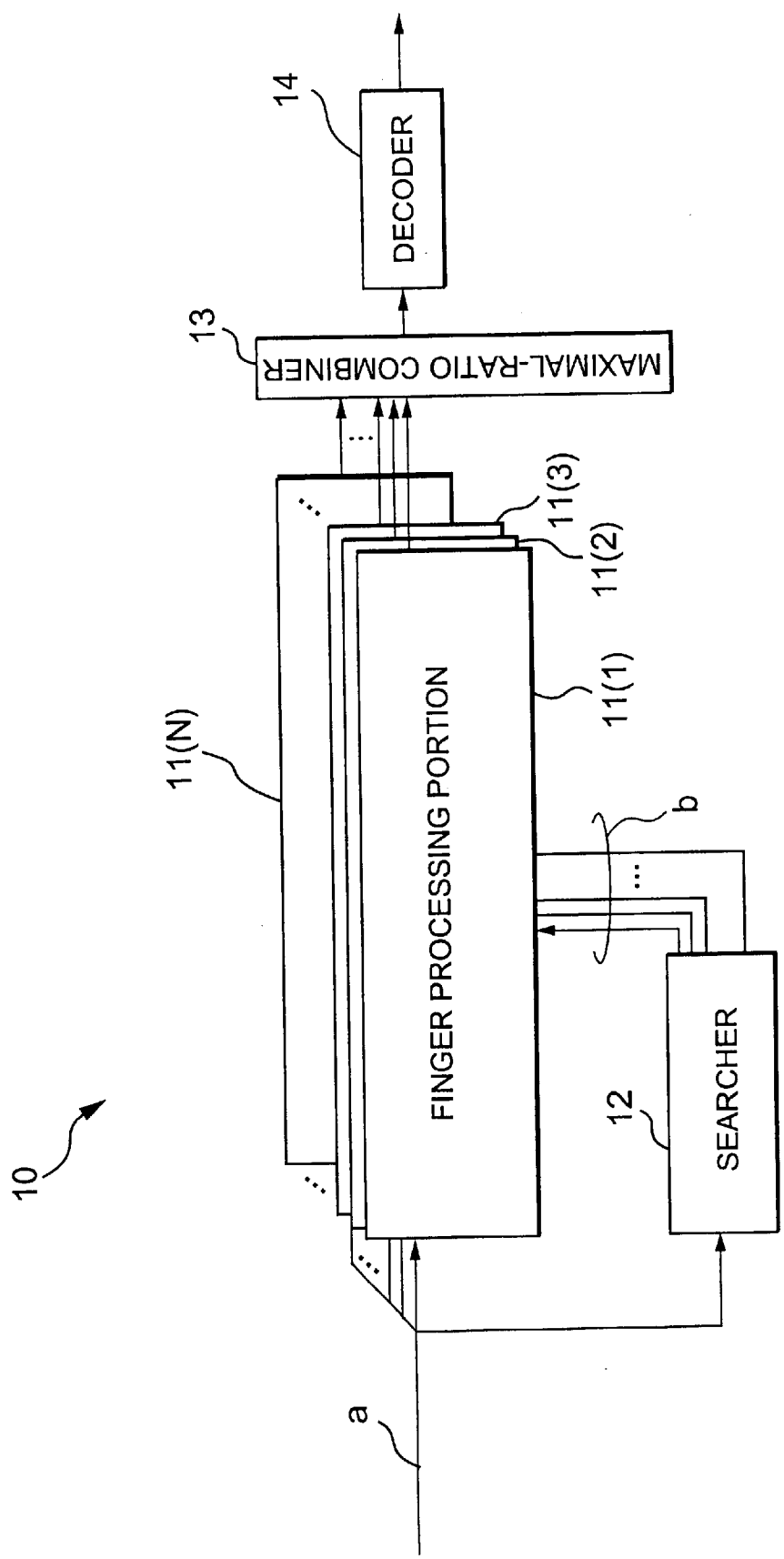
FIG. 1 shows a block diagram for use in describing a CDMA receiver according to this invention.

Referring to FIG. 1, it is assumed that a receiver 10 according to this invention is used in each base station of a CDMA system and is operable in accordance with a diversity rake technique, as will become clear later. In this connection, the illustrated receiver 10 may be called a CDMA receiver or a base station receiver. Although not shown in FIG. 1, the base station has a high frequency amplifier portion for high frequency amplification and frequency conversion and an intermediate frequency (IF) amplifier portion for intermediate frequency amplification. At any rate, the illustrated CDMA receiver is supplied with received data signals a through the high frequency amplifier portion and the intermediate frequency (IF) amplifier portion in the form of a baseband signal.

In the example being illustrated, the CDMA receiver 10 has first through N-th finger processing portions 11(1) to 11(N) where N represents a first positive integer which is not less than two, and a searcher 12. The first through the N-th finger processing portions 11(1) to 11(N) may be collectively called a rake receiver.

The searcher 12 receives the received data signals a and searches reception timing which is optimum for the first through the N-th finger processing portions 11(1) to 11(N). As a result, the searcher 12 supplies the first through the N-th finger processing portions 11(1) to 11(N) with the reception timing as detected reception timing signals b, as shown in FIG. 1. To this end, the illustrated searcher 12 calculates correlation values by successively shifting despreading timing of the received data signals a in a manner to be described later to search the optimum reception timing in each of the finger processing portions and to consequently detect chip synchronization.

The first through the N-th finger processing portions 11(1) to 11(N) process despreading operation of the received data signals a in response to the detected reception timing signals b and produce processed signals obtained by despreading the received data signals a. The processed signals may be referred to as detected data signals detected from the received data signals a.

The processed signals which are despread by the first through the N-th finger processing portions 11(1) to 11(N) are sent to a maximal-ratio combiner 13 for summing up the processed signals by the use of the maximal-ratio combining technique. In other words, the maximal-ratio combiner 13 carries out rake combining related to the processed signals sent from the first through the N-th finger processing portions 11(1) to 11(N) and produces a rake combined signal which may be simply called a combined data signal also. The rake combined signal is delivered to a decoder 14 to be decoded into a decoded data signal.

Figure 2:
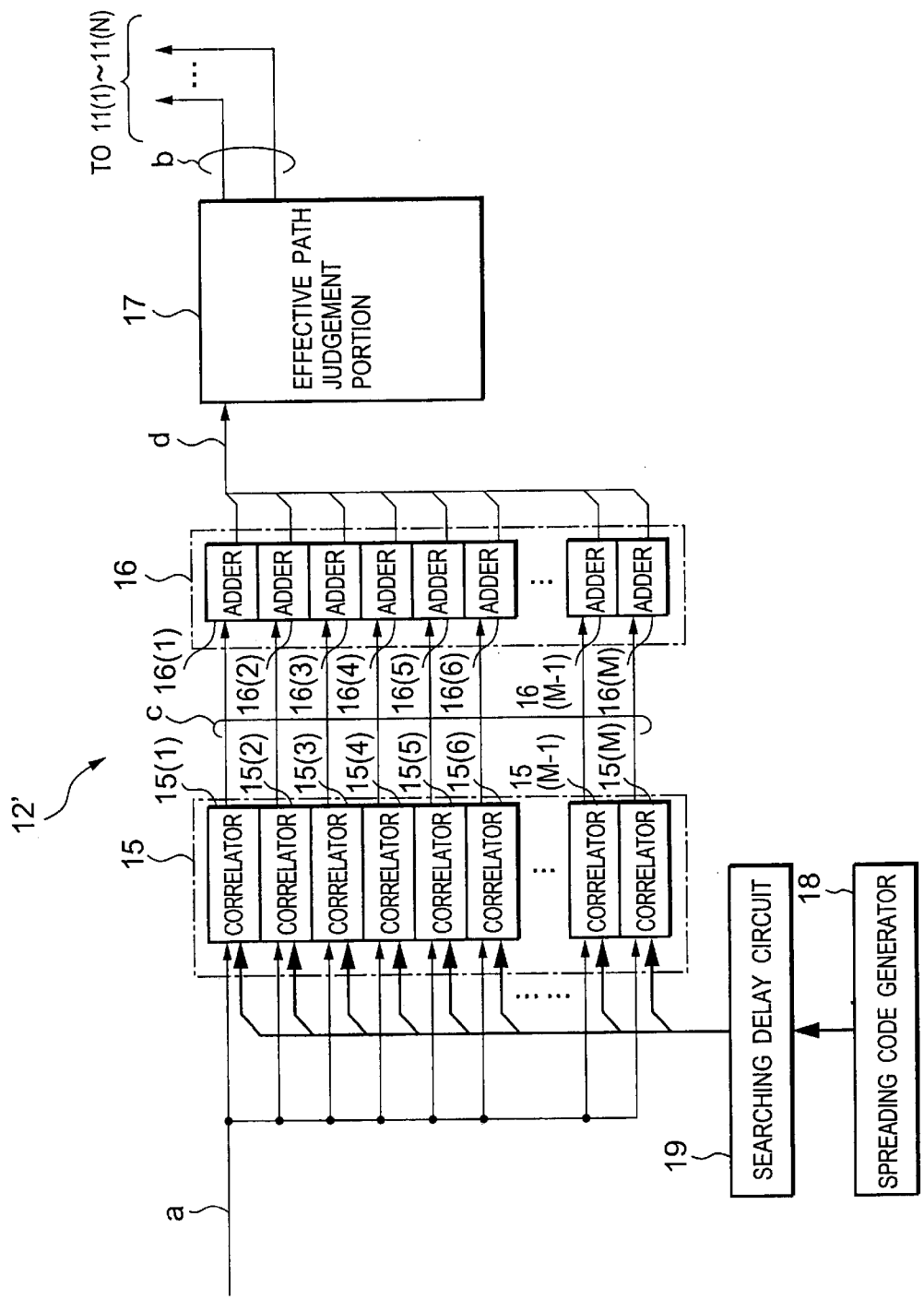
FIG. 2 shows a block diagram of a conventional searcher.

Referring to FIG. 2, a conventional searcher 12' will be described at first in order to facilitate an understanding the present invention. The searcher 12' is supplied with the received data signals a in the manner which is described above. Responsive to the received data signals a, the searcher 12' searches optimum reception timing to produce the reception timing signals b which are supplied to the first through the N-th finger processing portions 11(1) to 11(N) (FIG. 1).

The searcher 12' comprises a correlation calculator (which may be called a correlation portion) 15, an adder portion 16, an effective path judgement portion 17, a spreading code generator 18 for generating a spreading code which is used to despread the received data signals a, and a searching delay circuit 19.

The correlation calculator 15 comprises first through M-th correlators 15(1) to 15(M) while the adder portion 16 comprises first through M-th adders 16(1) to 16(M) where M represents a second positive integer which is not less than two. The first through the M-th correlators 15(1) to 15(M) are connected to the first through the M-th adders 16(1) to 16(M), respectively.

With this structure, the spreading code is delivered from the spreading code generator 18 to the searching delay circuit 19 to be successively delayed by the searching delay circuit 19 and to be thereafter delivered to the first through the M-th correlators 15(1) to 15(M). That is, the first through the M-th correlators 15(1) to 15(M) are supplied with first through M-th searching delayed spreading codes from the searching delay circuit 19. The first through the M-th correlators 15(1) to 15(M) despread the received data signals a by the first through the M-th searching delayed spreading codes to calculate first through M-th calculated correlation values c at the timing indicated by the first through the M-th searching delayed spreading codes, respectively. The first through the M-th calculated correlation values c are sent to the first through the M-th adders 16(1) to 16(M) to be added to previous correlation values. The first through the M-th adders 16(1) to 16(M) produce first through M-th added correlation values d which are supplied to the effective path judgement portion 17. Responsive to the first through the M-th added correlation values d, the effective path judgement portion 17 searches the reception timing having a highest level (detects a peak) to produce the optimum reception timing signals b.

Figure 3:
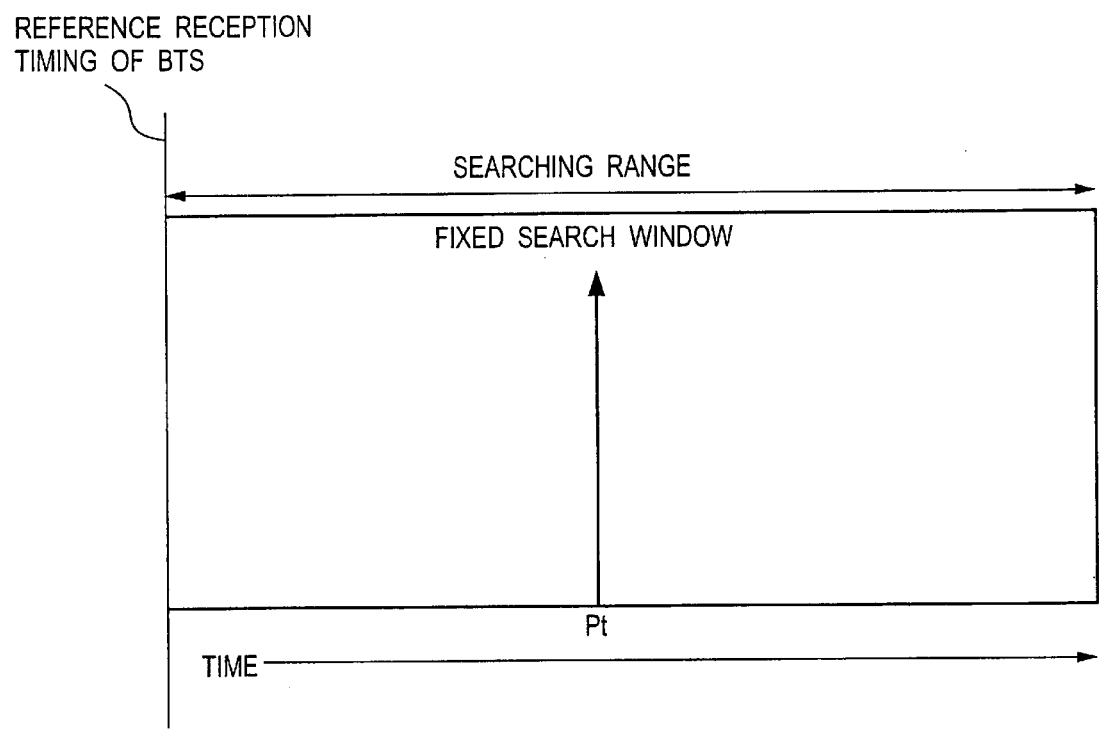
FIG. 3 is a view for use in describing a searching range in the searcher illustrated in FIG. 2.

Temporarily referring to FIG. 3, the searcher 12' has a fixed search window having a constant searching range where the searcher 12' can search. The constant searching range is determined by the second positive integer M for the correlators in the correlation calculator 15 and for the adders in the adder portion 16. The fixed search window is defined by a starting time instant (or a leading edge) which is equal to a reference reception timing of a base transceiver station (BTS) that has zero or no propagation delay. In other words, the fixed search window has no window offset. In order to expand or widen the constant searching range in the fixed search window, the searcher 12' must have a large number of the second positive integer M.

It will be assumed that the CDMA receiver 10 carries out reception operation under environment with a large propagation delay such as a case of having a large cell radius or the like. In this event, the conventional searcher 12' must comprise the correlation calculator 15 and the adder portion 16 which have the large number of correlators and the large number of adders, respectively. This is because the searcher 12' has the fixed search window and it is therefore necessary to make the second positive number M large in order to expand or widen the constant searching range. Accordingly, the conventional searcher 12' is large in structure, as mentioned in the preamble of the instant specification.

Figure 4:
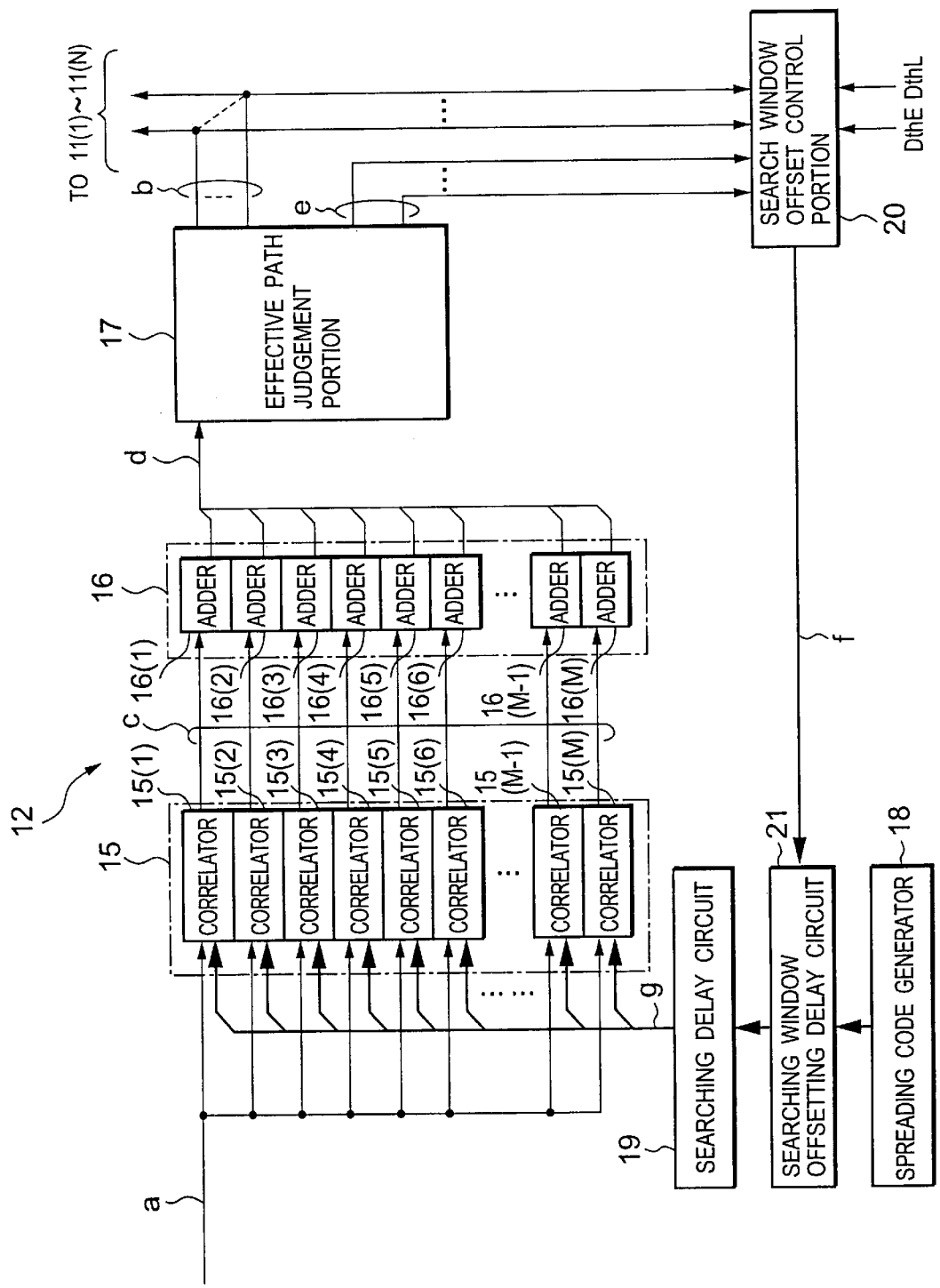
FIG. 4 shows a block diagram of a searcher according to a first embodiment of this invention.

Referring to FIG. 4, the searcher 12 according to a first embodiment of this invention is applicable to the CDMA receiver of the base station illustrated in FIG. 1. The illustrated searcher 12 is similar in structure and operation to the conventional searcher 12' illustrated in FIG. 2 except that the searcher 12 further comprises a search window offset control portion 20 and a search window offsetting delay circuit 21.

The search window offset control portion 20 is connected to the effective path judgement portion 17 and is supplied with an early threshold value DthE and a late threshold value DthL which will be described as the description proceeds. The effective path judgement portion 17 produces, as judged effective path information, peak timing signals b and peak level signals e. The peak timing signals b is supplied to the first through the Nth finger processing portions 11(1) to 11(N) (FIG. 1) as the decoded reception timing signals in a manner which is described above. The peak timing signals b and the peak level signals e are supplied to the search window offset control portion 20. Responsive to the peak timing signals b and the peak level signals e, the search window offset control portion 20 calculates a search window offset amount f with reference to the early threshold value DthE and the late threshold value DthL to produce the search window offset amount f which is supplied to the search window offsetting delay circuit 21. The search window offsetting delay circuit 21 is supplied with the spreading code generated by the spreading code generator 18.

The search window offsetting delay circuit 21 delays the spreading code by the search window offset amount f to produce an offsetting delayed spreading code which is supplied to the searching delay circuit 19. The searching delay circuit 19 successively delays the offsetting delayed spreading code to produce the first through the M-th searching delayed spreading codes g which are supplied to the first through the M-th correlators 15(1) to 15(M), respectively.

Figure 5:
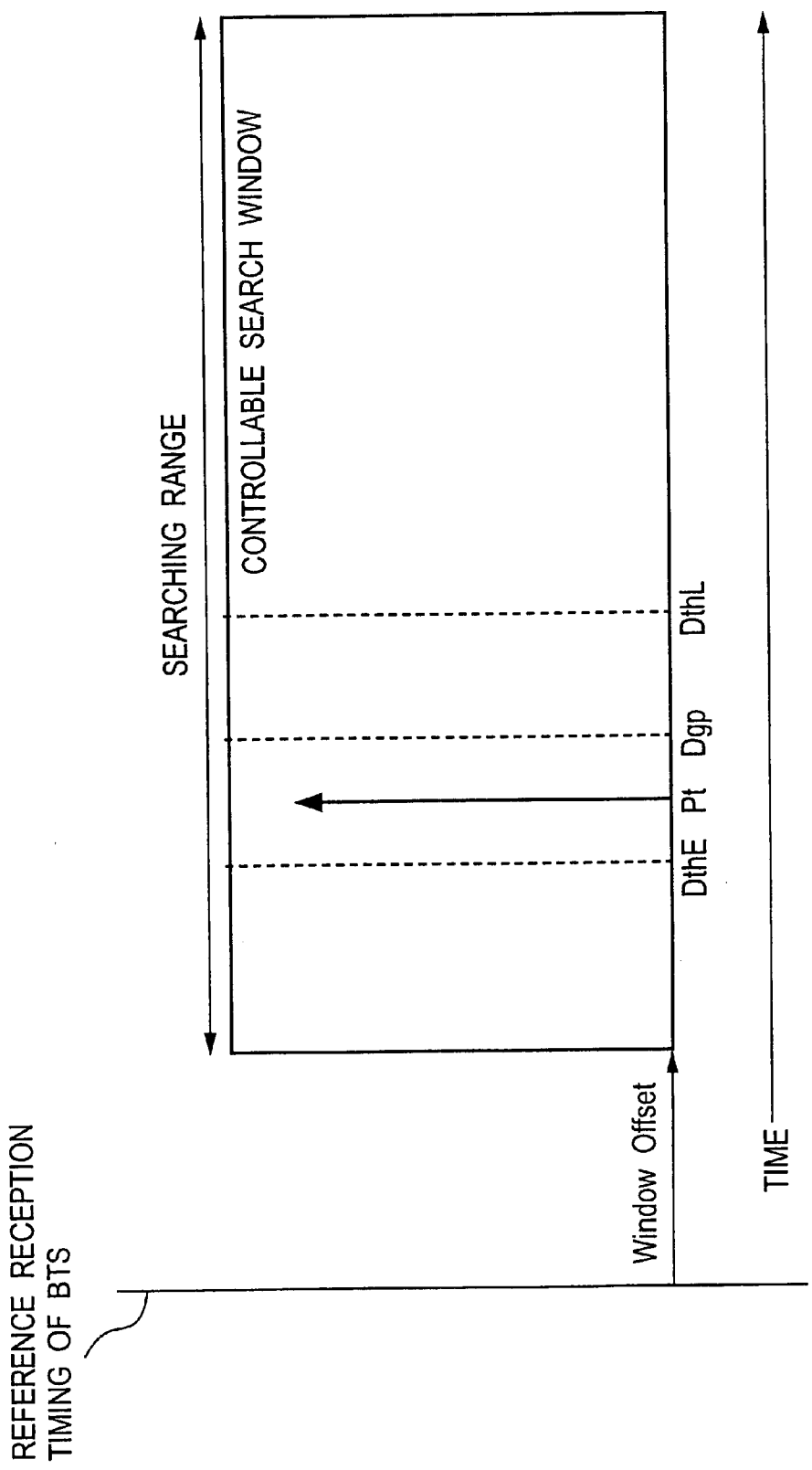
FIG. 5 is a view for use in describing a searching range in the searcher illustrated in FIG. 4.

Temporarily referring to FIG. 5, the searcher 12 has a controllable search window having the constant searching range where the searcher 12 can search. In the manner which is described above, the constant searching range is determined by the second positive integer M for the correlators in the correlation calculator 15 and for the adders in the adder portion 16. It will be assumed that the first through the M-th correlators 15(1) to 15(M) of the correlation calculator 15 carry out despreading operations at timings a time interval of Rc chips apart. In this event, the constant searching range is equal to M times as large as Rc chips. Namely, Searching Range=(M×Rc) chips.

As shown in FIG. 5, it is possible for the searcher 12 to temporally shift or delay the controllable search window by a window offset indicated by the search window offset amount f from the reference reception timing of the BTS that has zero or no propagation delay. In other words, the controllable search window has the window offset. The controllable search window is defined by a controllable starting time instant (or a controllable leading edge) which is equal to a sum of the reference reception timing of the BTS and the window offset.

In FIG. 5, a reference symbol of Pt represents a relative reception timing of an effective path within the controllable search window. In the example being illustrated, FIG. 5 shows a state where there is only one effective path. It is noted that the effective path has an actual propagation delay (an absolute reception timing) which is equal to a sum of the window offset and the relative reception timing Pt of the effective path. Each of the early threshold value DthE and the late threshold value DthL is a threshold value for controlling the window offset. A reference symbol of Dgp represents a target reception timing for the relative reception timing Pt on renewing the widow offset. That is, the window offset is controlled so that the relative reception timing Pt is equal to the target reception timing Dgp in a manner to be described later.

It is noted that each of the relative reception timing Pt, the early threshold value DthE, the late threshold value DthL, and the target reception timing Dgp has a value measured on the basis of the controllable starting time instant (or the controllable leasing edge) of the controllable search window.

Referring to FIG. 4 in addition to FIG. 5, description will be made as regards operation of the searcher 12. The received data signals a are supplied to the first through the M-th correlators 15(1) to 15(M) of the correlation calculator 15. The first through the M-th correlators 15(1) to 15(M) are supplied with the first through the M-th searching delayed spreading codes g from the searching delay circuit 19 so that the first through the M-th correlators 15(1) to 15(M) carry out the despreading operations at the timings the time interval of Rc chips apart.

The first through the M-th correlators 15(1) to 15(M) despread the received data signals a by using the first through the M-th searching delayed spreading codes to calculate the first through the M-th calculated correlation values c at the timing indicated by the first through the M-th searching delayed spreading codes, respectively. The first through the M-th calculated correlation values c are sent to the first through the M-th adders 16(1) to 16(M) to be added to previous correlation values a designated times. The first through the M-th adders 16(1) to 16(M) produce first through M-th added correlation values d which are supplied to the effective path judgement portion 17. The first through the M-th added correlation values d have level variations which correspond to a delay profile.

Responsive to the first through the M-th added correlation values d, the effective path judgement portion 17 searches the reception timing having the highest level to determine the effective path on the basis of various threshold values and previous search processed results. That is, the effective path judgement portion 17 carries out peak detection or search processing and path control processing.

Description will proceed to the path control processing in the effective path judgement portion 17. It will be assumed that the path (the reception timing) detected at a previous timing is not detected at a current timing. In this event, the effective path judgement portion 17 does not immediately judge this path as an invalid path but judges this path as the invalid path when this condition continues several times. This processing is called a forward protection processing. Similarly, it will be assumed that a new path is detected at the current timing. In this event, the effective path judgement portion 17 does not immediately judge this new path as a valid path but judges this new path as the valid path when the new path is detected at the same timing several times. This processing is called a backward protection processing. This several times may be set by a parameter. In a manner described above, the effective path judgement portion 17 carries out protection processing in the path control processing so that the valid path does not vary frequently. The effective path judgement portion 17 produces the optimum reception timing signals (or the peak timing signals) b and the peak level signals e.

The peak timing signals b are sent to the first through the N-th finger processing portions 11(1) to 11(N) (FIG. 1) and the search window offset control portion 20. In addition, the peak level signals e corresponding to the peak timing signals b are supplied to the search window offset control portion 20. Responsive to the peak timing signals b and the peak level signals e, the search window offset control portion 20 calculates the search window offset amount f with reference to the early threshold value DthE and the late threshold value DthL to produce the search window offset amount f which is supplied to the search window offsetting delay circuit 21. The search window offsetting delay circuit 21 is supplied with the spreading code generated by the spreading code generator 18.

The search window offsetting delay circuit 21 delays the spreading code by the search window offset amount f to produce the offsetting delayed spreading code which is supplied to the searching delay circuit 19. With this structure, it is possible to shift timings for the despreading in the first through the M-th correlators 15(1) to 15(M) of the correlation calculator 15 and it is therefore possible to temporally move or shift the controllable search window illustrated in FIG. 5.

Referring now to FIG. 5, description will be made about operation of the search window offset control portion 20. It will be assumed that there is only one effective path as illustrated in FIG. 5 in order to simplify the description. The search window offset control portion 20 always monitors the reception timing Pt of the effective path, the early threshold value DthE, and the late threshold value DthL.

It will be assumed that the reception timing Pt of the effective path lies in a range between the early threshold value DthE and the late threshold value DthL, both inclusive, as illustrated in FIG. 5, namely, DthE $\leq$ Pt $\leq$ DthL. In this event, the search window offset control portion 20 does not renew the search window offset amount f.

It will be assumed that the reception timing Pt of the effective path is earlier than the early threshold value DthE, namely, Pt<DthE. In this event, the search window offset control portion 20 renews the search window offset amount f so that the reception timing Pt of the effective path coincides with the target reception timing Dgp, namely, Pt=Dgp. That is:

Window Offset←Window Offset−(Dgp−Pt).

In other words, the search window offset control portion 20 allows the controllable search window to come near to the reference reception timing of the BTS.

Likewise, it will be assumed that the reception timing Pt of the effective path is later than the late threshold value DthL, namely, DthL<Pt. In this event, the search window offset control portion 20 renews the search window offset amount f so that the reception timing Pt of the effective path coincides with the target reception timing Dgp, namely, Pt=Dgp. That is:

Window Offset←Window Offset+(Pt−Dgp).

In other words, the search window offset control portion 20 keeps the controllable search window from the reference reception timing of the BTS.

Under the circumstances, it is desirable that the target reception timing Dgp has a middle timing between the early threshold value DthE and the late threshold value DthL, namely, Dgp=(DthE+DthL)/2. In some situations the target reception timing Dgp may be changed. In addition, the early threshold value DthE and the late threshold value DthL may be changed by the conditions of propagation environment or the like.

As described above, the searcher 12 according to this invention makes the controllable search window follow variations of the reception timing Pt of the effective path. As a result, it is possible to carry out reception by carrying out searching without increasing the number of the correlators in the correlation calculator although a large propagation delay is predicted. It is assumed that there is a plurality of effective paths. In this event, the search window offset control portion 20 monitors one of the effective paths that has the highest level to renew the search window offset amount f in a similar manner which is described above.

Figure 6:
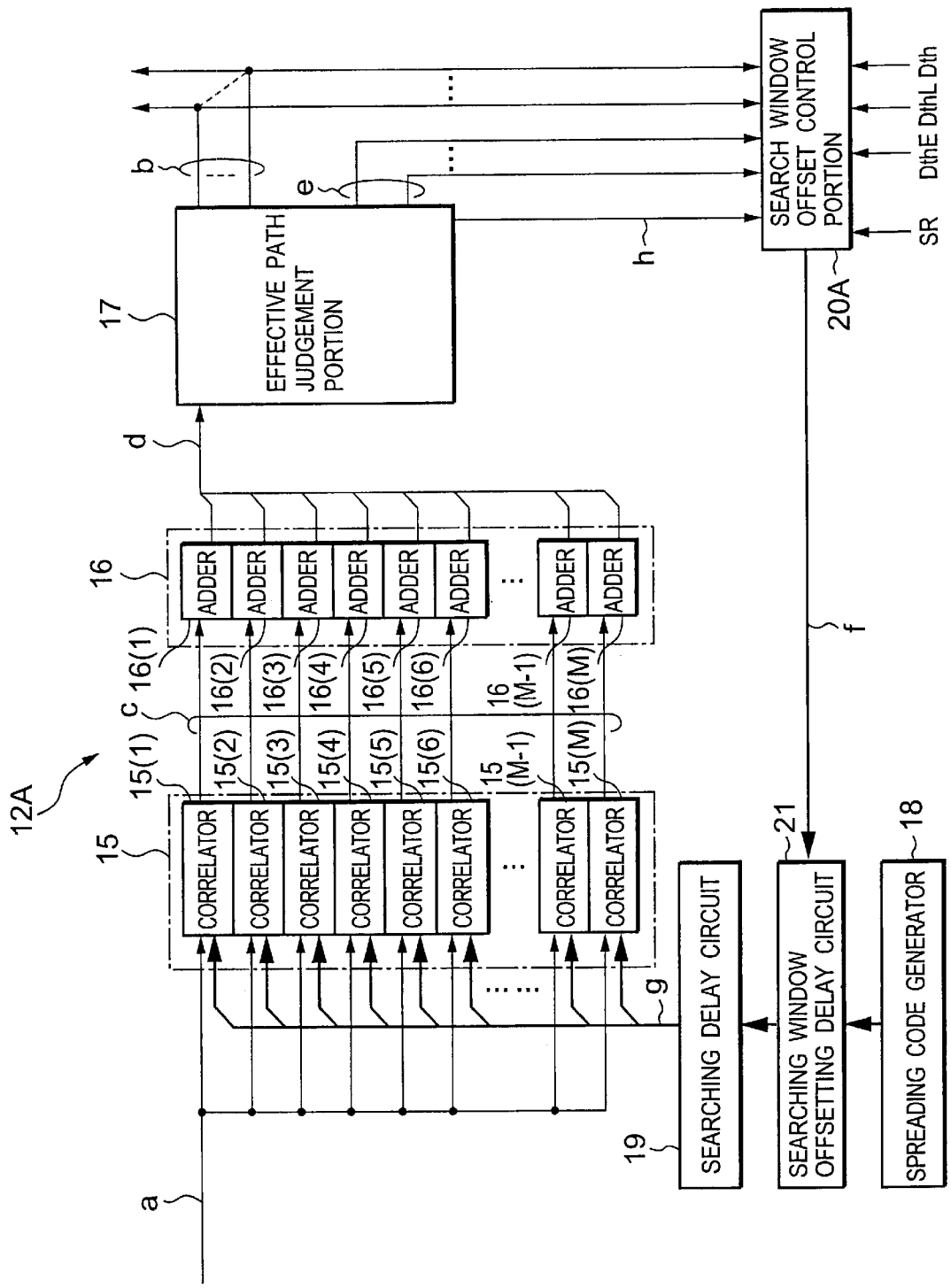
FIG. 6 shows a block diagram of a searcher according to a second embodiment of this invention.

Referring to FIG. 6, the description will proceed to a searcher 12A according to a second embodiment of this invention which is also applicable to the CDMA receiver of the base station illustrated in FIG. 1. The illustrated searcher 12A is similar in structure and operation to the searcher 12 illustrated in FIG. 4 except that the search window offset control portion is modified from that illustrated in FIG. 4 as will later become clear. The search window offset control portion is therefore depicted at 20A.

The search window offset control portion 20A is supplied with not only the peak timing signals b, the peak level signals e, the early threshold value DthE, and the late threshold value DthL but also a path protection state h, a threshold value width Dth, and a searching range SR as shown in FIG. 6.

In the above-mentioned first embodiment, in a case where there is a plurality of paths, when the searching window offset is renewed under environment where level variations occur caused by fading or the like, an amount of renewal may be much. In this event, there is the possibility that several paths come off the search window. As a result, reception quality is degraded.

In addition, it is assumed that several paths come off the search window after renewal of the searching window offset and thereafter the paths in the searching window disappear. In this event, the CDMA receiver is put into a pulled-out state because there is no processing for rescuing the paths from coming off.

Accordingly, in order to control the search window offset amount f in more detail, the CDMA receiver comprises the searcher 12A as illustrated in FIG. 6.

The searcher 12A is basically similar in operation to the searcher 12 illustrated in FIG. 4 except that a protection processing is added to each effective path determined by the effective path judgement portion 17. That is, the effective path judgement portion 17 supplies the search window offset control portion 20A with the path protection state h for each effective path. The path protection state h indicates one of the pulled-out state, a backward protection state, a forward protection state, and a synchronization state.

In the manner which will later become clear, the search window offset control portion 20A renews the search window offset amount f by using the threshold value width Dth, the early threshold value DthE, and the late threshold value DthL, the path protection state h, the searching range SR, the peak timing signals b for the effective paths, and the peak level signals e.

Figure 7:
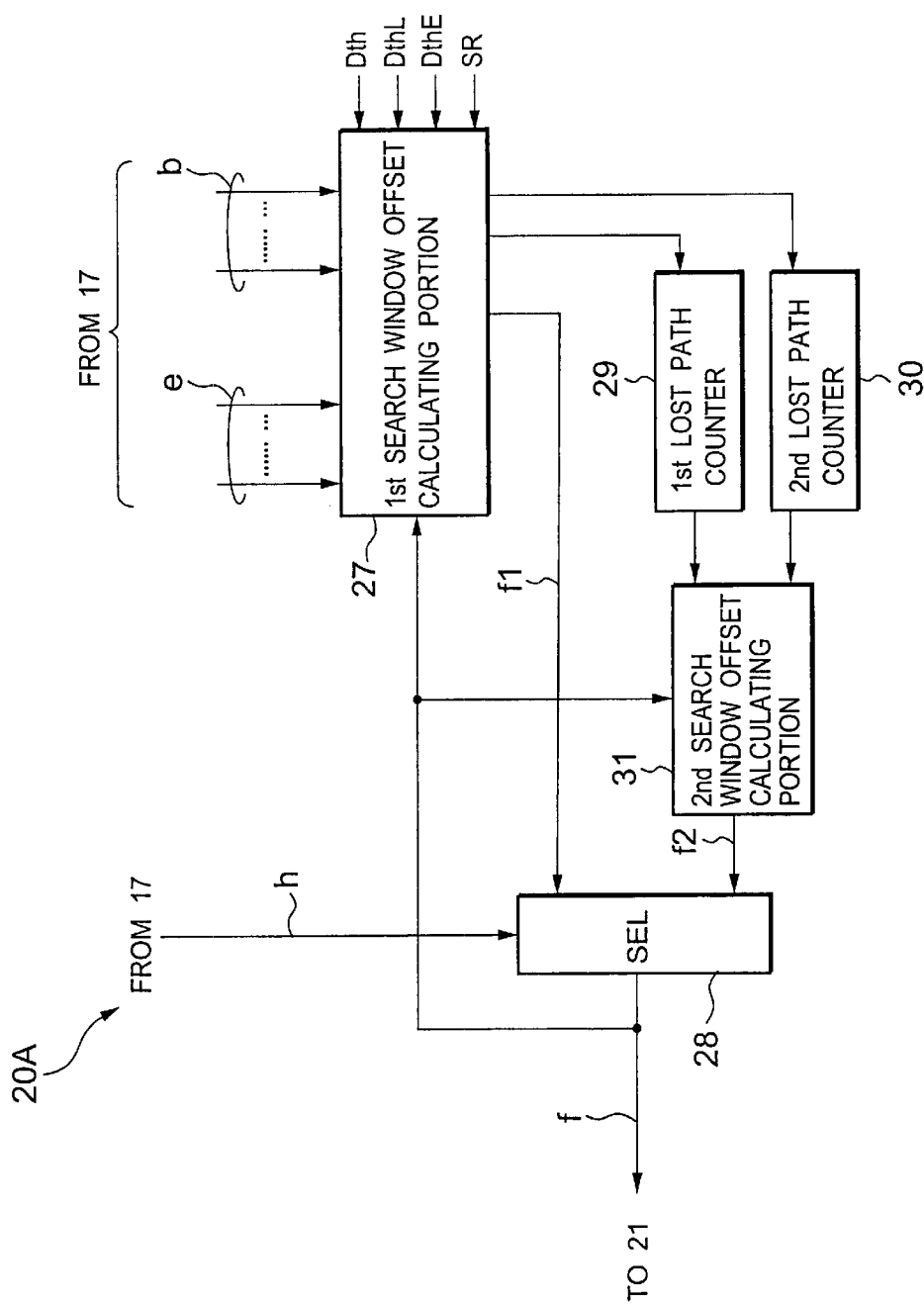
FIG. 7 shows a block diagram of a search window offset control portion is used in the searcher illustrated in FIG. 6.

Turning to FIG. 7, the search window offset control portion 20A comprises a first search window offset calculating portion 27, a selector 28, a first lost path counter 29, a second lost path counter 30, and a second search window offset calculating portion 31.

The first search window offset calculating portion 27 is supplied with the peak timing signals b for the effective paths, the peak level signals e, the threshold value width Dth, the early threshold value DthE, the late threshold value DthL, and the searching range SR. In the manner which will later become clear, the first search window offset calculating portion 27 calculates a first search window offset amount f1 by using the peak timing signals b for the effective paths, the peak level signals e, the threshold value width Dth, the early threshold value DthE, the late threshold value DthL, and the searching range SR. The first search window offset amount f1 is supplied to the selector 28. In addition, when any path is lost in a case where the first search window offset amount f1 is renewed, the first search window offset calculating portion 27 increments either the first lost path counter 29 or the second lost path counter 30.

Specifically, the first lost path counter 29 is incremented when a front effective path is lost by separating the controllable search window from the reference reception timing of the BTS. Similarly, the second lost path counter 30 is incremented when a rear effective path is lost by allowing the controllable search window to come near the reference reception timing of the BTS. The first and the second lost path counters 29 and 30 produce early and late lost counted values E_lost_ct and L_lost_ct, respectively, which are supplied to the second search window offset calculating portion 31.

The second search window offset calculating portion 31 calculates a second search window offset amount f2 by using the early and the late lost counted values E_lost_ct and L_lost_ct. The second search window offset amount f2 is supplied to the selector 28.

The selector 28 is also supplied with the path protection state h from the effective path judgement portion 17 (FIG. 6). The selector 28 selects, as the search window offset amount f, one of the first and the second search window offset amounts f1 and f2 in response to the path protection state h. Specifically, when the path protection state h indicates that all of the effective paths are pulled off, the selector 28 produces the second search widow offset amount f2 as the search window offset amount f. When the path protection state h indicates that all of the effective paths are not pulled off, the selector 28 produces the first search window offset amount f1 as the search window offset amount f.

The search window offset amount f is supplied to not only the search window offsetting delay circuit 21 (FIG. 6) but also the first and the second search window offset calculating portions 27 and 31.

Figure 8:
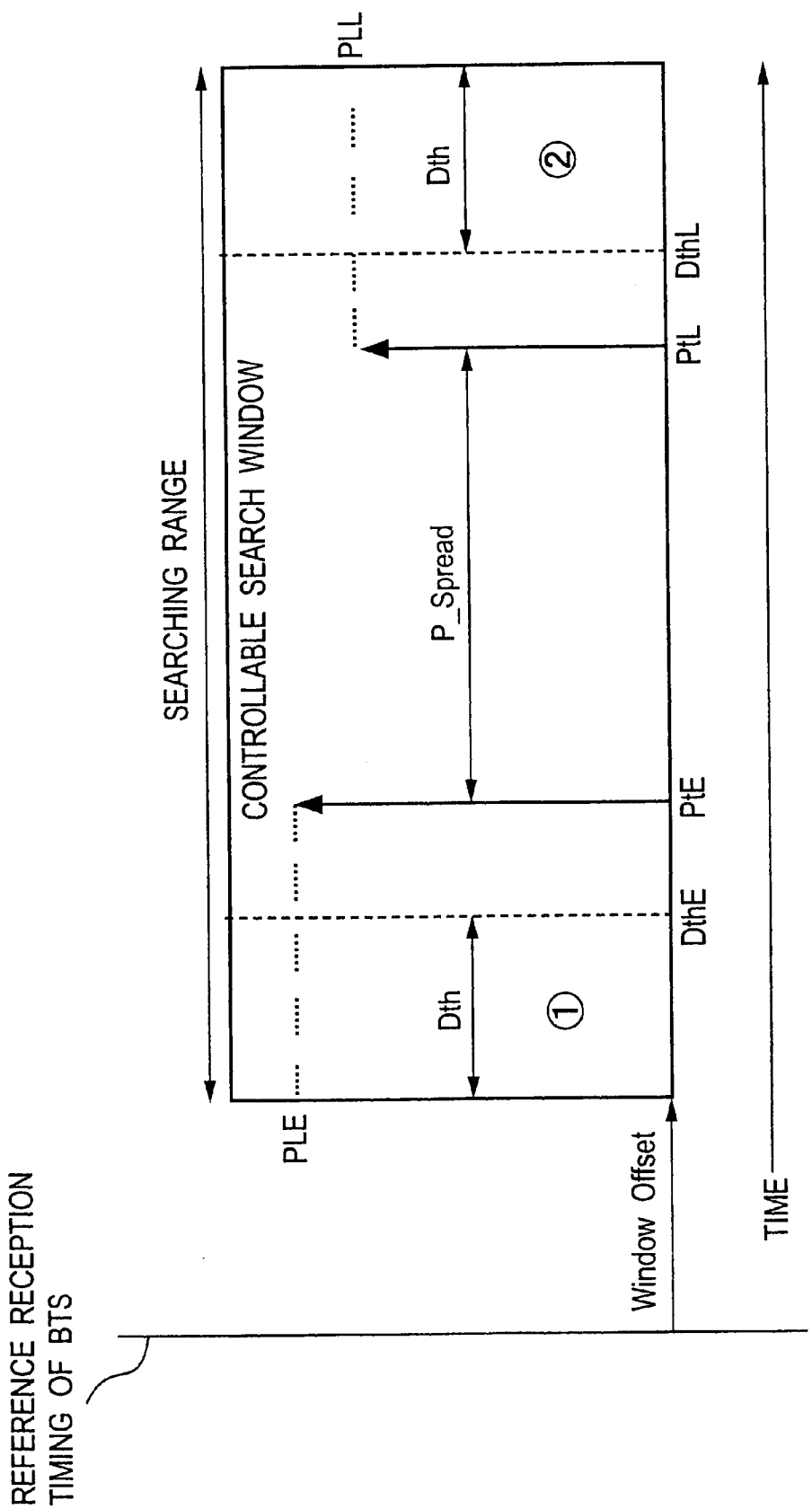
FIG. 8 is a view for use in describing a searching range in the searcher illustrated in FIG. 6.

FIG. 8 is a view showing the searching range which is similar to that illustrated in FIG. 5. FIG. 8 is different from FIG. 5 as follows. In FIG. 8, a reference symbol of PtE represents a reception timing for the closest effective path, a reference symbol of PtL represents a reception timing for the farthest effective path, a reference symbol of Dth represents the threshold value width for judging whether or not the search window offset amount is renewed, a reference symbol of DthE represents the early threshold value for the reception timing of the closest effective path, and a reference symbol of DthL represents the late threshold value of the reception timing of the farthest effective path. In addition, a reference symbol of PLE represents a reception peak level of the closest effective path, a reference symbol of PLL represents a reception peak level of the farthest effective path, and a reference symbol of P_Spread represents a path interval between the closest effective path and the farthest effective path.

Figure 9:
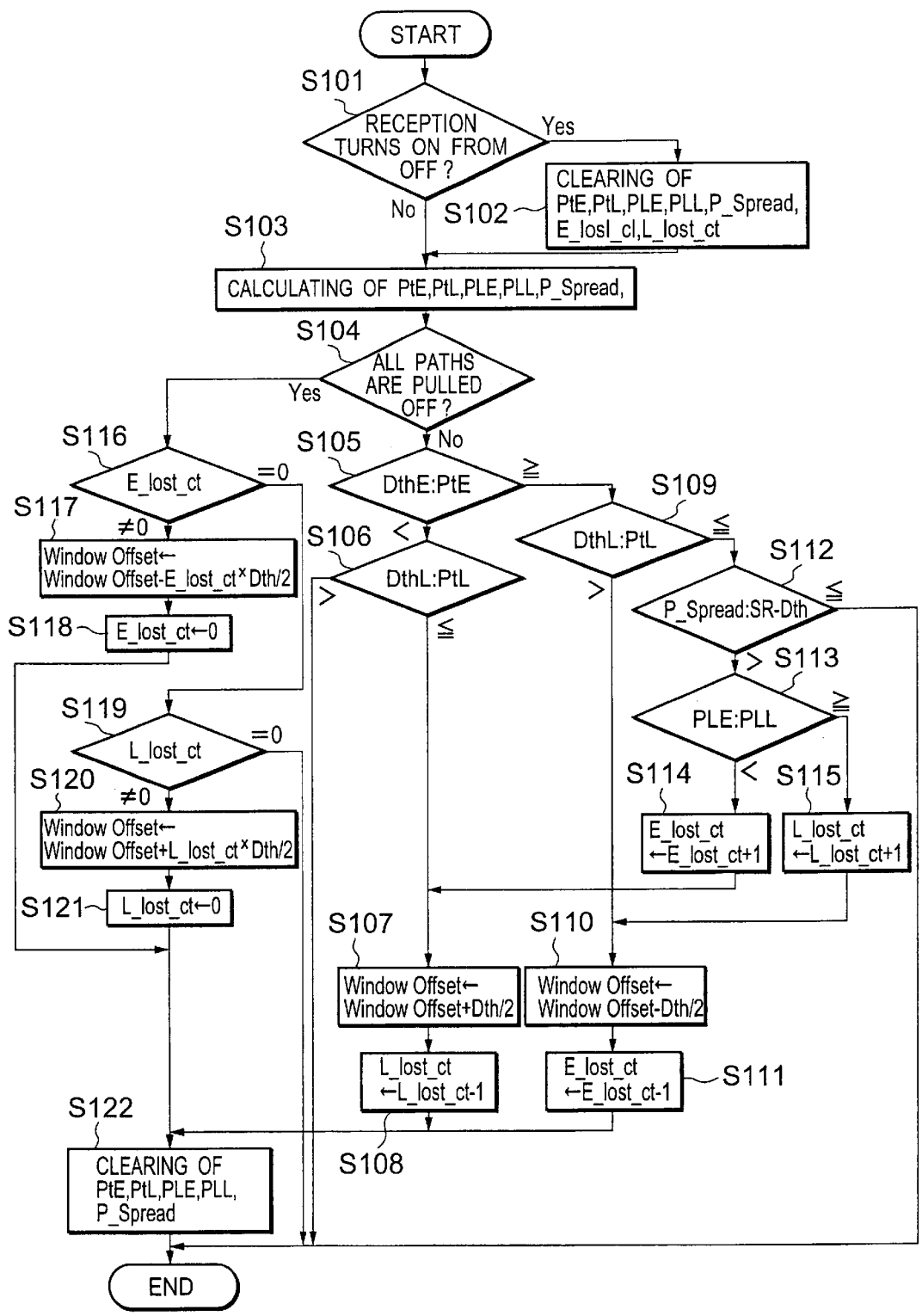
FIG. 9 shows a flow chart for use in describing operation of the searcher illustrated in FIG. 7.

FIG. 9 is a flow chart for showing operation of the searcher 12A illustrated in FIG. 6. As illustrated in FIG. 9, description will be made about roughly operation of the searcher 12A as follows.

The searcher 12A always monitors the reception timing of the closest effective path, the peak level of the closet effective path, the reception timing of the farthest effective path, the peak level of the farthest effective path, and the path interval between the closest effective path and the farthest effective path. When the closest effective path is close over, the searcher 12A shifts the controllable search window so as to put the controllable search window close to the reference reception timing of the BTS. When the farthest effective path is apart over, the searcher 12A shifts the controllable search window so as to keep the controllable search window away from the reference reception timing of the BTS.

In this event, the searcher 12A makes the controllable search window so as to do not shift using the threshold value width Dth, the early threshold value DthE, and the late threshold value DthL if possible. If the searcher 12A shifts the controllable search window, the searcher 12A makes the effective paths lost to the utmost. In addition, when the searcher 12A unavoidably loses the effective paths in a case of shifting the controllable search window, the searcher 12A memorizes the lost effective paths as memorized effective paths. Subsequently, when the effective paths in the controllable search window disappear, the searcher 12A carries out processing for rescuing the effective paths from losing by returning the controllable search window.

When the CDMA receiver is initially put into a reception ON state from a reception OFF state (YES in a first step S101), the first step S101 is followed by a second step S102 at which the search window offset control portion 20A clears or resets the reception timing PtE of the closest effective path, the reception timing PtL of the farthest effective path, the reception peak level PLE of the closest effective path, the reception peak level PLL of the farthest effective path, the path interval P_Spread, and the early and the late lost counted values E_lost_ct and L_lost_ct.

The first and the second steps S101 and S102 proceed to a third step S103 at which the search window offset control portion 20A calculates, by using the peak timing signals b for the effective paths and the peak level signals e, the reception timing PtE of the closest effective path, the reception timing PtL of the farthest effective path, the reception peak level PLE of the closest effective path, the reception peak level PLL of the farthest effective path, and the path interval P_Spread. Inasmuch as each parameter may change small in a moment, the search window offset control portion 20A calculates the reception timing PtE of the closest effective path, the reception timing PtL of the farthest effective path, the reception peak level PLE of the closest effective path, the reception peak level PLL of the farthest effective path by temporarily averaging using an oblivion coefficient or the like.

Specifically, it will be assumed that a symbol of fp represents the oblivion coefficient, a symbol of PtE(n−1) represents the reception timing of the closest effective path that is calculated in a previous processing, and a symbol of PtE(n) represents the reception timing of the closest effective path that is calculated using the peak timing b of the effective path in a current processing. In this event, the reception timing PtE of the closest effective path is calculated as follows:

$$PtE = fp \times PtE(n-1) + (1-fp) \times PtE(n).$$

Each of the reception timing PtL of the farthest effective path, the reception peak level PLE of the closest effective path, and the reception peak level PLL of the farthest effective path is calculated in a similar manner. The path interval P_Spread is calculated as follows:

$$P\_Spread = PtL - PtE.$$

The path interval P_Spread is calculated by temporarily averaging using the oblivion coefficient fp.

The step S103 is succeeded by a fourth step S104 at which the search window offset control portion 20A judges whether or not the path protection state h indicates that all of effective paths are pulled off. When the path protection state h indicates that all of the effective paths are not pulled off, the first search window offset amount f1 calculated by the first search window offset calculating portion 27 is effective. In this event, the fourth step S104 is followed by a fifth step S105.

At the fifth step S105, the first search window offset calculating portion 27 judges whether or not the reception timing PtE of the closest effective path is close too or the reception timing PtE of the closest effective path is not later than the threshold value DthE for the reception timing of the closest effective path. When the reception timing PtE of the closest effective path is later than the threshold value DthE for the reception timing of the closest effective path, namely, DthE<PtE, the fifth step S105 proceeds to a sixth step S106, the first search window offset calculating portion 27 judges whether or not the reception timing PtL of the farthest effective path is far too or the reception timing PtL of the farthest effective path is not earlier than the threshold value DthL for the reception timing of the farthest effective path. When the reception timing PtL of the farthest effective path is earlier than the threshold value DthL for the reception timing of the farthest effective path, namely, DthL>PtL, the first search window offset calculating portion 27 does not renew the first search window offset amount f1.

When the reception timing PtL of the farthest effective path is not earlier than the threshold value DthL for the reception timing of the farthest effective path, namely, DthL<PtL, the sixth step S106 is succeeded by a seventh step S107 at which the first search window offset calculating portion 27 adds Dth/2 to the first search window offset amount f1 to keep the controllable search window away from the reference reception timing of the BTS. That is:

$$\text{Window Offset} \leftarrow \text{Window Offset} + Dth/2.$$

Although a renewal amount is equal to Dth/2 in the example being illustrated, the renewal amount may be changed in some situations. The seventh step S107 is followed by an eighth step S108 at which the second path lost counter 30 decrements the second path lost counted value L_lost_ct by one, namely, $$L\_lost\_ct \leftarrow L\_lost\_ct - 1.$$

In addition, the second path lost counted value L_lost_ct has minimum of zero.

When the reception timing PtE of the closest effective path is not later than the threshold value DthE for the reception timing of the closest effective path, namely, DthE≧PtE, the fifth step S105 proceeds to a ninth step S109 at which the first search window offset calculating portion 27 judges whether or not the reception timing PtL of the farthest effective path is far too or the reception timing PtL of the farthest effective path is not earlier than the threshold value DthL for the reception timing of the farthest effective path. When the reception timing PtL of the farthest effective path is earlier than the threshold value DthL for the reception timing of the farthest effective path, namely, DthL>PtL, the ninth step S109 is succeeded by a tenth step 110 at which the first search window offset calculating portion 27 subtracts Dth/2 from the first search window offset amount f1 to allow the controllable search window to come near the reference reception timing of the BTS. That is:

Window Offset←Window Offset−$Dth/2$.

The tenth step S110 is followed by an eleventh step S111 at which the first path lost counter 29 decrements the first path lost counted value E_lost_ct by one, namely, E_lost_ct←E_lost_ct−1.

In addition, the first path lost counted value E_lost_ct has minimum of zero.

When the reception timing PtE of the closest effective path is not later than the threshold value DthE for the reception timing of the closest effective path, namely, DthE≧PtE, and when the reception timing PtL of the farthest effective path is not earlier than the threshold value DthL for the reception timing of the farthest effective path, namely, DthL≦PtL, the fifth and the ninth steps S105 and S109 proceed to a twelfth step S112 at which the first search window offset calculating portion 27 compares the path interval P_Spread with a value (SR−Dth) obtained by subtracting the threshold value width Dth from the search range SR. When the path interval P_Spread is not less than the value (SR−Dth), namely, P_Spread ≦(SR−Dth), the first search window offset calculating portion 27 does not renew the first search window offset value f1.

When the path interval P_Spread is more than the value (SR−Dth), namely, P_Spread>(SR−Dth), the first search window offset calculating portion 27 loses either the closest effective path or the farthest effective path to shift the controllable search window.

Specifically, the twelfth step S112 is succeeded by a thirteenth step S113 at which the first search window offset calculating portion 27 compares the reception peak level PLE of the closest effective path with the reception peak level PLL of the farthest effective path. When the reception peak level PLE of the closest effective path is lower than the reception peak level PLL of the farthest effective path, namely, PLE<PLL, the thirteenth step S113 is followed by a fourteenth step S114 at which the first lost path counter 29 increments the first path lost counted value E_lost_ct by one, namely, E_lost_ct←E_lost_ct+1.

The fourteenth step S114 is turned to the seventh step S107. That is, the first search window offset calculating portion 27 shifts the controllable search window so as to lose the closest effective path.

When the reception peak level PLE of the closest effective path is not lower than the reception peak level PLL of the farthest effective path, namely, PLE≧PLL, the thirteenth step S113 proceeds to a fifteenth step S115 at which the second lost path counter 30 increments the second path lost counted value L_lost_ct by one, namely, L_lost_ct←L_loct_ct+1.

The fifteenth step S115 is turned to the tenth step S110. That is, the first search window offset calculating portion 27 shifts the controllable search window so as to lose the farthest effective path.

It will be assumed that the path protection state h indicates that all of the effective paths are pulled off. In this event, the searcher 12A carries out processing for rescuing the lost effect paths in the manner which will presently become clear.

In particularly, the fourth step S104 is followed by a sixteenth step S116 at which the second search window offset calculating portion 31 determines whether or not the first path lost counted value E_lost_ct in the first lost path counter 29 is equal to zero, namely, E_lost_ct=0.

When the first path lost counted value E-lost_ct is not equal to zero, the second search window offset calculating portion 31 allows the controllable search window to come near the reference reception timing of the BTS because there is the path lost by the first search window offset calculating portion 27 that is nearer than the controllable search window. Specifically, the sixteenth step S116 proceeds to a seventeenth step S117 at which the second search window offset calculating portion 31 calculates the second search window offset amount f2 in accordance with the first path lost counted value E_lost_ct as follows:

Window Offset←Window Offset−($E\_lost\_ct \times Dth/2$).

The seventeen step S117 is succeeded by an eighteenth step S118 at which the first search window offset calculating portion 27 clears the first lost path counter 29 to zero, namely, E_lost_ct=0.

When the first path lost counted value E_lost_ct is equal to zero, the sixteenth step S116 is followed by a nineteenth step S119 at which the second search window offset calculating portion 31 determines whether or not the second path lost counted value L_lost_ct in the second lost path counter 30 is equal to zero, namely, L_lost_ct=0.

When the second path lost counted value L_lost_ct is not equal to zero, the second search window offset calculating portion 31 keeps the controllable search window away from the reference reception timing of the BTS because there is the path lost by the first search window offset calculating portion 27 that is farther than the controllable search window. Specifically, the nineteenth step S119 proceeds to a twentieth step S120 at which the second search window offset calculating portion 31 calculates the second search window offset amount f2 in accordance with the second path lost counted value L_lost_ct as follows:

Window Offset←Window Offset+($L\_lost\_ct \times Dth/2$).

The twentieth step S120 is succeeded by a twenty-first step S121 at which the first search window offset calculating portion 27 clears the second path lost counter 30 to zero, namely, L_lost_ct=0.

When both of the first and the second path lost counted values E_lost_ct and L_lost_ct are equal to zero, namely, E_lost_ct=0 and L_lost_ct=0, the second search window offset calculating portion 31 does not shift the controllable search window because there is no lost path.

In addition, when the controllable search window is shifted, the first search window offset calculating portion 27 clears the reception timing PtE of the closest effective path, the reception timing PtL of the farthest effective path, the reception peak level PLE for the closest effective path, the reception peak level PLL for the farthest effective path, and the path interval P_Spread.

By carrying out the above-mentioned processing, it is possible to stably carry out reception operation.

As described above, according to this invention, it is possible to carry out searching and reception operation without increasing the number of the correlators in the correlation calculator 15 in a case where a large propagation delay is predicted. This is because the controllable search window follows fluctuations of the reception timing for the paths.

While this invention has thus far been described in conjunction with a few embodiments thereof, it will readily be possible for those skilled in the art to put this invention into practice in various other manners. For example, this invention may be applicable to a receiver which is used in a mobile terminal instead of the base station. In addition, this invention may not be restricted to the maximal-ratio combining.

At any rate, the receiver according to this invention becomes small in size even when the searching range is substantially widened as each cell or service area becomes wide. This is because the controllable search window is shifted or delayed on the basis of a propagation delay in received data signals or fluctuations of reception timing. This means that this invention is very effective for the CDMA receiver which executes the diversity rake combining.

What is claimed is:

1. A method of searching reception timing of received data signals which are received through a plurality of paths, using a searcher having a search window in a CDMA system to detect the reception timing, by establishing the search window of said searcher so as to follow a propagation delay in the received data signals; comprising
    producing, as the reception timing, a peak timing and a peak level;
    calculating, in response to the peak timing and the peak level, a search window offset amount with reference to threshold values;
    generating a spreading code; and
    delaying the spreading code by the search window offset amount to produce an offset delayed spreading code.

2. A method as claimed in claim 1, wherein the calculation step comprises the steps of:
    successively delaying the offset delayed spreading code to produce successively delayed spreading codes;
    carrying out correlation calculations between the received data signals and the successively delayed spreading codes to produce correlation values; and
    successively summing the correlation values to produce the summed correlation values.

3. A method of searching reception timing from received data signals which are received through a plurality of paths, using a searcher in a CDMA system to detect the reception timing, comprising the steps of:
    calculating, in a controllable search window having a constant searching range, correlation values between the received data signals and successfully delayed spreading codes, to produce summed up correlation values;
    determining the reception timing from the summed correlation values; and
    shifting the controllable search window so that the reception timing lies within the controllable search window.

4. A method of searching reception timing of received data signals which are received through a plurality of paths, using a searcher having a search window in a CDMA system to detect the reception timing, by establishing the search window of said searcher so as to follow a propagation delay in the received data signals ; comprising
    producing, as the reception timing, a peak timing and a peak level;
    calculating, in response to the peak timing and the peak level, a search window offset amount with reference to threshold values;
    generating a spreading code; and
    delaying the spreading code by the search window offset amount to produce an offset delayed spreading code;
    said method of searching reception timing further comprises:
        said producing further produces a path protection state,
        said calculating, in response to the peak timings, the peak levels, and the path protection state, a search window offset amount with reference to threshold values and a searching range;
        generating a spreading code; and
        delaying the spreading code by the search window offset amount to produce an offset delayed spreading code.

5. A method as claimed in claim 4, wherein the calculation step comprises the steps of:
    successively delaying the offset delayed spreading code to produce successively delayed spreading codes;
    carrying out correlation calculations between the reception signals and the successively delayed spreading codes to produce correlation values; and
    successively summing the correlation values to produce summed correlation values.

6. A method of receiving received data signals to produce a decoded data signal in a CDMA system, comprising the steps of:
    calculating, in a controllable search window having a constant searching range, correlation values between the received data signals and successively delayed spreading codes, to produce summed correlation values;
    determining receptio n timing f rom the summed correlation values;
    shifting the controllable search window so that the reception timing lies within the controllable search window;
    despreading the received data signals by using the reception tim ing to produce despread and detected data signals;
    carrying out maximal-ratio combining of the despread and detected data signals to produce a combined data signal; and
    decoding the combined data signal into the decoded data signal.

7. A method as claimed in claim 6, wherein the determining step comprises the step of producing, as the reception timing, a peak timing and a peak level, and the shifting step comprises the steps of:
    calculating, in response to the peak timing and the peak level, a search window offset amount with reference to threshold values;
    generating a spreading code; and
    delaying the spreading code by the search window offset amount to produce an offset delayed spreading code.

8. A method as claimed in claim 6, wherein the determining step comprises the step of producing, as the reception timing, peak timings, peak levels, and a path protection state, and the shifting step comprises the steps of:
    calculating, in response to the peak timings, the peak levels, and the path protection state, a search window offset amount with reference to threshold values and the searching range;
    generating a spreading code; and
    delaying the spreading code by the search window offset amount to produce an offset delayed spreading code.

9. A searcher for use in a CDMA receiver to search reception timing from received data signals which are received through a plurality of paths, comprising:

calculation means for calculating, in a controllable search window having a constant searching range, correlation values between the received data signals and successively delayed spreading codes, to produce summed correlation values;

decision means for determining the reception timing from the summed correlation values; and shifting means for shifting the controllable search window so that the reception timing lies within the controllable search window.

10. A searcher as claimed in claim 9, wherein the decision means produces, as the reception timing, a peak timing and a peak level, and wherein the shifting means comprises:

a search window offset control portion, supplied with threshold values and connected to the decision means, for calculating, in response to the peak timing and the peak level, a search window offset amount with reference to the threshold values;

a spread code generator for generating a spreading code; and a search window offsetting delay circuit for delaying the spreading code by the search window offset amount to produce an offset delayed spreading code which is supplied to the calculation means.

11. A searcher as claimed in claim 10, wherein the calculation means comprises:

a searching delay circuit for successively delaying the offset delayed spreading code to produce successively delayed spreading codes;

a plurality of correlators for carrying out correlation calculations between the received data signals and the successively delayed spread codes to produce correlation values; and a plurality of adders for successively summing the correlation values to produce the summed correlation values.

12. A searcher as claimed in claim 9, wherein the decision means produces the reception timing, peak timings, peak levels, and a path protection state, and wherein the shifting means comprises:

a search window offset control portion, supplied with threshold values and the searching range and connected to the decision means, for calculating, in response to the peak timings, the peak levels, and the path protection state, a search window offset amount with reference to the threshold values and the searching range;

a spreading code generator for generating a spreading code; and a search window offsetting delay circuit for delaying the spreading code by the search window offset amount to produce an offset delayed spreading code which is supplied to the calculation means.

13. A searcher as claimed in claim 12, wherein the calculation means comprises:

a searching delay circuit for successively delaying the offset delayed spreading code to produce successively delayed spreading codes;

a plurality of correlators for carrying out correlation calculations between the received data signals and the successively delayed spreading codes to produce correlation values; and a plurality of adders for successively summing the correlation values to produce the summed correlation values.

14. A searcher as claimed in claim 12, wherein the search window offset control portion comprises:

a first search window offset calculating portion for calculating, in response to the peak timing and the peak levels, a first search window offset amount with reference to the threshold values and the searching range;

a first lost path counter for incrementing a first lost path count value by one when a closest effective path is lost by keeping the controllable search window away from a reference reception timing;

a second lost path counter for incrementing a second lost path count value by one when a farthest effective path is lost by allowing the controllable search window to come near the reference reception timing;

a second search window offset calculating portion for calculating a second search window offset amount on the basis of the first and the second lost path count values; and a selector for selecting, in response to the path protection state, one of the first and the second search window offset amounts as the search window offset amount.

15. A CDMA receiver as claimed in claim 13, wherein the determining means producing, as the reception timing, peak timings, peak levels, and a path protection state, wherein the shifting means comprises:

a search window offset control portion, supplied with threshold values and the searching range and connected to the decision means, for calculating, in response to the peak timings, the peak levels, and the path protection state, a search window offset amount with reference to the threshold values and the searching range;

a spread code generator for generating a spreading code; and a search window offsetting delay circuit for delaying the spread code by the search window offset amount to produce an offsetting delayed spreading code which is supplied to the calculation means.

16. A CDMA receiver for use in a CDMA system to produce a decoded data signal in response to received data signals, comprising:

calculation means for calculating, in a controllable search window having a constant searching range, correlation values between the received data signals and successively delayed spreading codes, to produce summed correlation values determining means for determining reception timing from the summed correlation values;

shifting means for shifting the controllable search window so that the reception timing lies within the controllable search window;

despreading means for despreading the received data signals by using the reception timing to produce despread and detected data signals;

means for carrying out maximal-ratio combining of the despread and detected data signals to produce a combined data signal; and means for decoding the combined data signal into the decoded data signal.

17. A CDMA receiver as claimed in claim 16, wherein the determining means produces, as the reception timing, a peak timing and a peak level, and wherein the shifting means comprises:

a search window offset control portion, supplied with threshold values and connected to the determining means, for calculating, in response to the peak timing and the peak level, a search window offset amount with reference to the threshold values;

a spreading code generator for generating a spreading code; and a search window offset delay circuit for delaying the spreading code by the search window offset amount to produce an offset delayed spreading code which is supplied to the calculation means.

18. A method of searching reception timing from received data signals which are received through a plurality of paths using a searcher having a search window in a CDMA system to detect the reception timing by causing the search window of said searcher to follow fluctuations in the reception timing; comprising:

producing, as the reception timing, a peak timing and a peak level;

calculating, in response to the peak timing and the peak level, a search window offset amount with reference to threshold values;

generating a spreading code; and delaying the spreading code by the search window offset amount to produce an offset delayed spreading code.

19. A method as claimed in claim 18, wherein the calculation step comprises the steps of:

successively delaying the offset delayed spreading code to produce successively delayed spreading codes;

carrying out correlation calculations between the received data signals and the successively delayed spreading codes to produce correlation values; and successively summing the correlation values to produce summed correlation values.

20. A method of searching reception timing from received data signals which are received through a plurality of paths using a searcher having a search window in a CDMA system to detect the reception timing by causing the search window of said searcher to follow fluctuations in the reception timing; comprising:

producing, as the reception timing, a peak timing and a peak level;

calculating, in response to the peak timing and the peak level, a search window offset amount with reference to threshold values;

generating a spreading code; and delaying the spreading code by the search window offset amount to produce an offset delayed spreading code;

wherein said producing step further produces a path protection state, wherein said calculating step calculates said search window offset amount in response to the path protection state and with reference to threshold values and a searching range;

generating a spreading code; and delaying the spreading code by the search window offset amount to produce an offset delayed spreading code.

21. A method as claimed in claim 20, wherein the calculation step comprises the steps of:

successively delaying the offset delayed spreading code to produce successively delayed spreading codes;

carrying out correlation calculations between the reception signals and the successively delayed spreading codes to produce correlation values; and successively summing the correlation values to produce summed correlation values.

* * * * *